United States Patent
Stapleton

(10) Patent No.: US 9,628,018 B2
(45) Date of Patent: Apr. 18, 2017

(54) PANEL MOUNTING BRACKET WITH UNDER-MOUNTING CLAMP AND RELATED METHODS

(71) Applicant: Kevin Stapleton, New Braunsfel, TX (US)

(72) Inventor: Kevin Stapleton, New Braunsfel, TX (US)

(*) Notice: Subject to any disclaimer, the term of this patent is extended or adjusted under 35 U.S.C. 154(b) by 0 days.

(21) Appl. No.: 15/203,043

(22) Filed: Jul. 6, 2016

(65) Prior Publication Data

US 2016/0315579 A1 Oct. 27, 2016

Related U.S. Application Data

(62) Division of application No. 14/528,399, filed on Oct. 30, 2014, now Pat. No. 9,397,605.

(60) Provisional application No. 61/897,473, filed on Oct. 30, 2013.

(51) Int. Cl.
| | |
|---|---|
| *H02S 20/22* | (2014.01) |
| *H02S 20/23* | (2014.01) |
| *F24J 2/52* | (2006.01) |
| *E04B 1/41* | (2006.01) |

(52) U.S. Cl.
CPC .............. *H02S 20/22* (2014.12); *E04B 1/40* (2013.01); *F24J 2/5245* (2013.01); *F24J 2/5254* (2013.01); *H02S 20/23* (2014.12); *F24J 2002/5218* (2013.01); *Y02B 10/12* (2013.01); *Y02B 10/20* (2013.01); *Y02E 10/47* (2013.01)

(58) Field of Classification Search
CPC ......... H02S 20/22; H02S 20/23; F24J 2/5254; F24J 2/5245; F24J 2002/5218; Y02B 10/12; Y02B 10/20; Y02E 10/47
USPC ........................................................ 52/173.3
See application file for complete search history.

(56) References Cited

U.S. PATENT DOCUMENTS

| | | |
|---|---|---|
| 5,121,683 A | 6/1992 | Bielfeldt |
| 5,367,843 A | 11/1994 | Hirai et al. |
| 5,497,587 A | 3/1996 | Hirai et al. |
| 5,571,338 A | 11/1996 | Kadonome et al. |
| 6,105,317 A | 8/2000 | Tomiuchi et al. |
| 7,434,362 B2 | 10/2008 | Liebendorfer |
| 7,956,280 B2* | 6/2011 | Kobayashi ............ F24J 2/5211 126/704 |
| 7,963,074 B2 | 6/2011 | Schwarze et al. |
| 8,181,402 B2* | 5/2012 | Tsuzuki .................. F24J 2/045 126/621 |

(Continued)

*Primary Examiner* — James Ference
(74) *Attorney, Agent, or Firm* — Allen, Dyer, Doppelt & Gilchrist

(57) ABSTRACT

A system for mounting a solar panel(s) on a building, where the solar panel has an outer frame defining a lip. The system may include a plurality of panel mounting brackets each including a base to be positioned on the building, and a vertical extension having a proximal end coupled to the base and a distal end vertically spaced apart from the base, with the distal end defining a fastener channel therein. The system may also include a plurality of mounting clamps each including a bottom flange, and a top flange spaced apart from the bottom flange and partially overhanging the bottom flange and defining a slot therebetween to receive the lip. An end extension may couple respective ends of the bottom flange and top flange together, and a fastener channel connector may be coupled to the bottom flange and configured to be slidably received within the fastener channel.

20 Claims, 6 Drawing Sheets

(56) References Cited

U.S. PATENT DOCUMENTS

| | | | |
|---|---|---|---|
| 9,057,545 B2 | 6/2015 | Stapleton | |
| 9,145,685 B2 | 9/2015 | Stapleton | |
| 2002/0035811 A1* | 3/2002 | Heuel | E04D 13/10 52/506.05 |
| 2003/0070368 A1 | 4/2003 | Shingleton | |
| 2003/0101662 A1 | 6/2003 | Ullman | |
| 2003/0177706 A1* | 9/2003 | Ullman | E04D 13/12 52/3 |
| 2007/0295391 A1 | 12/2007 | Lenox et al. | |
| 2008/0053517 A1 | 3/2008 | Plaisted et al. | |
| 2008/0066801 A1 | 3/2008 | Schwarze | |
| 2008/0169018 A1 | 7/2008 | Miyamoto et al. | |
| 2008/0172955 A1* | 7/2008 | McClintock | F24J 2/5211 52/173.3 |
| 2009/0165843 A1* | 7/2009 | Horioka | F24J 2/4612 136/251 |
| 2010/0154784 A1* | 6/2010 | King | F24J 2/464 126/623 |
| 2010/0192505 A1* | 8/2010 | Schaefer | A47B 96/14 52/653.2 |
| 2010/0236183 A1* | 9/2010 | Cusson | F24J 2/5207 52/645 |
| 2010/0243035 A1* | 9/2010 | Nakamura | F24J 2/5211 136/251 |
| 2010/0276558 A1* | 11/2010 | Faust | F24J 2/5205 248/222.14 |
| 2010/0288338 A1* | 11/2010 | Yamamoto | F24J 2/4614 136/251 |
| 2011/0047903 A1* | 3/2011 | Kobayashi | F24J 2/5211 52/173.3 |
| 2011/0070765 A1* | 3/2011 | Kobayashi | F24J 2/5207 439/387 |
| 2011/0120529 A1* | 5/2011 | Nakamura | H02S 20/23 136/251 |
| 2011/0138585 A1* | 6/2011 | Kmita | F24J 2/5258 24/522 |
| 2011/0146669 A1* | 6/2011 | Bartol | F24J 2/464 126/704 |
| 2011/0154750 A1* | 6/2011 | Welter | F24J 2/045 52/173.3 |
| 2011/0214365 A1* | 9/2011 | Aftanas | F24J 2/5258 52/173.3 |
| 2011/0220596 A1* | 9/2011 | Cusson | F24J 2/5207 211/41.1 |
| 2011/0239546 A1* | 10/2011 | Tsuzuki | F24J 2/4614 52/11 |
| 2011/0314752 A1* | 12/2011 | Meier | F24J 2/5211 52/173.3 |
| 2012/0244729 A1* | 9/2012 | Rivera | F24J 2/4638 439/97 |
| 2012/0260977 A1* | 10/2012 | Stancel | F24J 2/5247 136/251 |
| 2012/0275844 A1* | 11/2012 | Kobayashi | F24J 2/5205 403/7 |
| 2013/0048056 A1* | 2/2013 | Kilgore | F24J 2/5256 136/251 |
| 2014/0109496 A1 | 4/2014 | Stapleton | |
| 2014/0338273 A1* | 11/2014 | Stapleton | F24J 2/5249 52/173.3 |

* cited by examiner

PANEL MOUNTING BRACKET WITH UNDER-MOUNTING CLAMP AND RELATED METHODS

This application is a divisional of U.S. patent application Ser. No. 14/528,399 filed Oct. 30, 2014, which claims the benefit of provisional application Ser. No. 61/897,473 filed Oct. 30, 2013, which are all hereby incorporated herein in their entireties by reference.

TECHNICAL FIELD

The present disclosure generally relates to mounting fixtures, and, more particularly, to mounting fixtures or brackets for rooftop panel installations, such as for solar panels, for example.

BACKGROUND

Solar panels, such as photovoltaic (PV) and solar water heating panels, are frequently used to take advantage of electrical power generation and heating properties of sunlight. To provide space savings and potentially enhanced efficiency, solar panels are in many cases installed on rooftops of buildings (e.g., office buildings, houses, etc.). However, because of winds and storms, the mounting fixtures used for installing solar panels on buildings need to be sufficiently strong and durable to reduce the chances of damage or injury from a panel coming loose during a storm, etc.

Various mounting fixtures have been developed for solar panel installation. For example, U.S. Pat. No. 7,963,074 discloses a device for fixing a photovoltaic module on a sloping roof having a roof structure and a roof covering with individual roof covering elements. The device includes a roof-side connecting piece disposable beneath the roof covering and a module-side connecting piece disposable on an edge of the photovoltaic module. A flexible retaining element interconnects the roof-side connecting piece and the module-side connecting piece. The flexible retaining element is loadable by pulling and adapted to be guided through the roof covering without altering a position or shape of the individual roof covering elements.

Despite the existence of such mounting fixtures, further enhancements may be desirable in some applications.

SUMMARY

A system for mounting at least one solar panel on a building is provided, where the solar panel has an outer frame defining a lip. The system may include a plurality of panel mounting brackets each including a base to be positioned on the building, and a vertical extension having a proximal end coupled to the base and a distal end vertically spaced apart from the base, the distal end defining a fastener channel therein. The system may also include a plurality of mounting clamps each including a bottom flange, a top flange spaced apart from the bottom flange and partially overhanging the bottom flange and defining a slot therebetween to receive the lip of the at least one solar panel, an end extension coupling respective ends of the bottom flange and top flange together, and a fastener channel connector coupled to the bottom flange and configured to be slidably received within the fastener channel.

More particularly, the fastener channel connector may comprise a T-shaped connector coupled to the bottom flange on a side thereof opposite the top flange and configured to be slidably received within the fastener channel. In accordance with another example embodiment, the fastener channel connector may include a horizontal member having an upper surface coupled to the bottom flange and a lower surface to be positioned on the distal end of the vertical extension, a pair of spaced apart vertical side members on opposite sides of the horizontal member and configured to extend along the distal end of the vertical extension when the lower surface of the horizontal member is positioned on the distal end of the vertical extension, a bolt coupled to the lower surface of the horizontal member and configured to extend downward into the fastener channel when the lower surface of the horizontal member is positioned on the distal end of the vertical extension, and a nut to be screwed onto the bolt and configured to be slidably received within the fastener channel.

In an example embodiment, the at least one solar panel may comprise a plurality of solar panels, and the fastener channel of each vertical extension may be configured to slidably receive at fastener channel connectors of least two mounting clamps each coupled to the outer frame of different respective solar panels. Each mounting clamp may further include at least one set screw carried by the bottom flange to secure the lip of the at least one solar panel within the slot.

The vertical extension may be laterally centered on the base, for example. Also by way of example, each panel mounting bracket may comprise aluminum. Furthermore, the base may define a plurality of mounting holes on opposing sides of the vertical extension. In one example embodiment, the vertical extension member may be hollow and may have a plurality of cross-support members therein.

A related solar panel mounting assembly including a panel mounting bracket and a mounting clamp as described briefly above are also provided. Moreover, a method for mounting at least one solar panel on a building using a plurality of the solar panel mounting assemblies is also provided.

DETAILED DESCRIPTION

Figure 1:
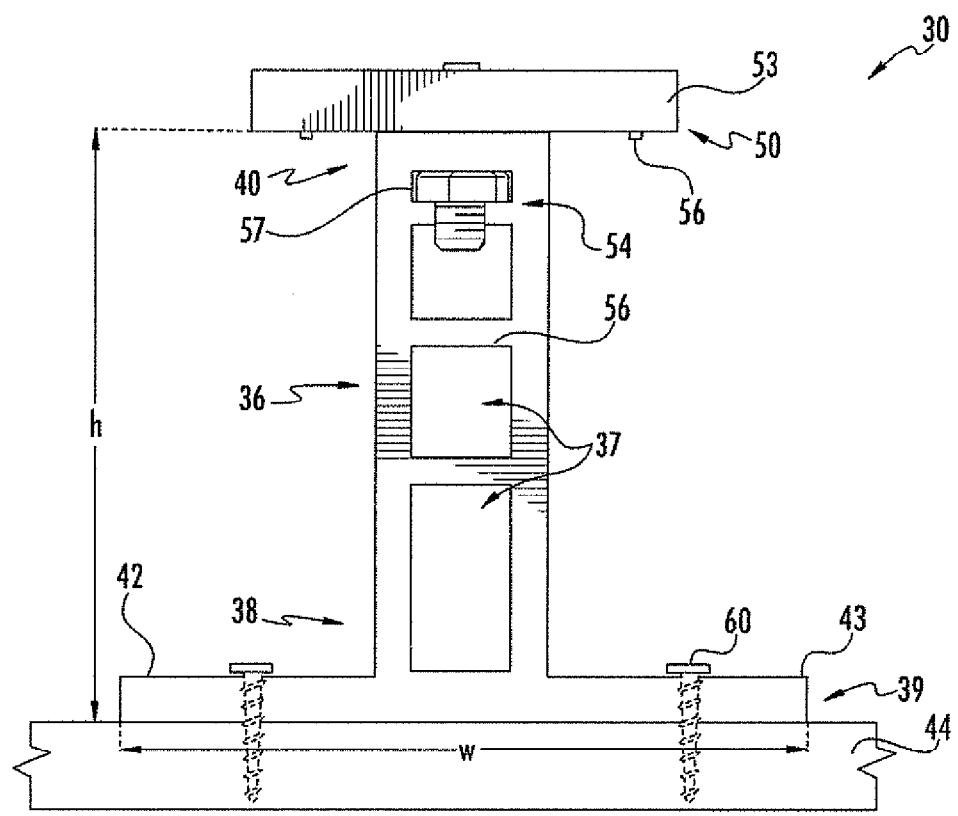
FIG. 1 is an end view of a panel mounting bracket in accordance with an exemplary embodiment of the invention including an under-mounting clamp.

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Referring initially to FIGS. 1-8, an assembly 30 for mounting one or more solar panels 31 on a building (e.g., on a roof) is first described. The assembly 30 illustratively includes a mounting bracket 32 (which is also referred to as a "foot" herein) for installing solar panels or modules 31. By way of background, solar modules or panels are typically mounted to racking using clamps that grip the module and hold it tight to rails which are mounted to rooftops by "L" shaped feet. The foot 32 illustrated in FIG. 1 advantageously avoids the need for such rails and clamps by mounting panels to roofs through the use of multiple feet (e.g., four feet, although other numbers of feet may be used), which are attached to the underside of each panel. More particularly, each panel 31 may include an outer frame 33 defining a lip 34 on the underside thereof, and in the example embodiment illustrated in FIGS. 7 and 8 the outer frame carries a photovoltaic cell array 35 therein (although the assembly 30 may also be used for mounting solar hot water heating panels as well, for example).

In the illustrated example, the foot 32 has a generally rectangular-shaped central vertical extension portion 36 with one or more hollow central area(s) or channel(s) 37 therethrough. A proximal end 38 of the vertical extension 36 is coupled to a flange or base 39 of the foot 32, and a distal end 40 of the vertical extension is vertically spaced apart from the proximal end, as seen in FIG. 1. An upper fastener channel slot or groove 41 is defined in the distal end 40 (see FIG. 2), though grooves may instead or in addition be provided on either or both sides of the vertical extension 36 in some embodiments, if desired. The foot 32 has a height h and a width w, which in an example embodiment may both be three inches, but other dimensions may also be used in different embodiments.

The base 39 illustratively includes two side extensions 42, 43 that extend outwardly away from the vertical extension 36 so that the vertical extension is centered on the base (although it need not be centered in all embodiments). Thus, when the bottom surface of the base 39 sits flat on a rooftop or roof deck 44 upon installation, the vertical extension 36 points upward or normal to the surface of the roof (although the vertical extension may form different angles with respect to the base besides 90° in different embodiments). Serrations or other surface features may optionally be included on portions of the upper surface of the distal end 40 and/or the bottom surface of the base 39, if desired. The serrations may advantageously provide for improved electrical grounding with the frame of the panel, as well as increased grip or friction, for example, as will be appreciated by those skilled in the art.

Figure 4:
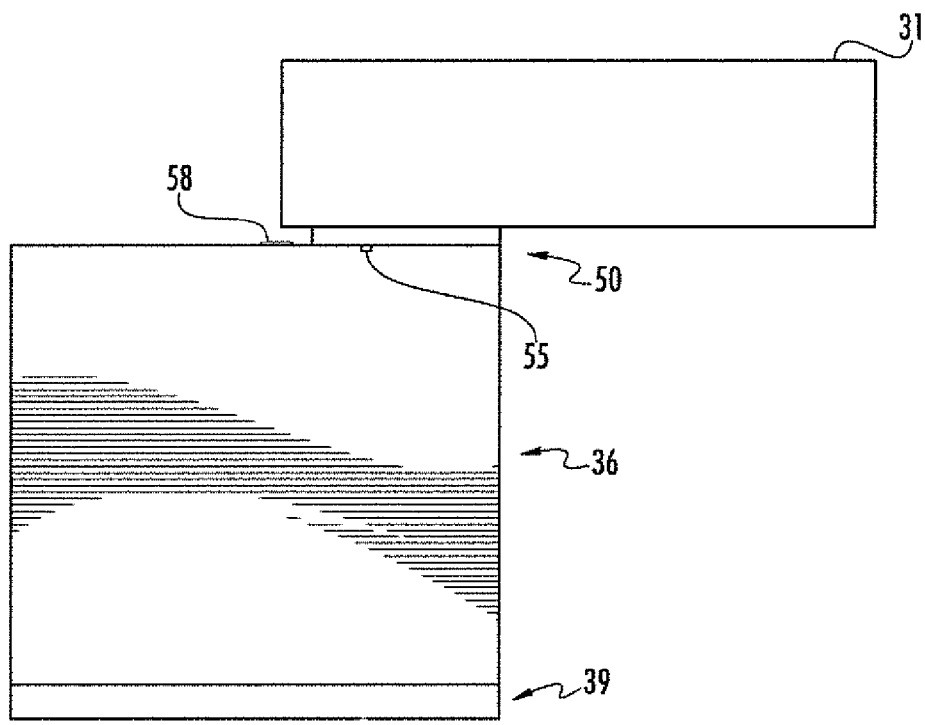
FIG. 4 is a side view of a mounting bracket attached to the frame of the underside of a panel at the perimeter of a panel array.
Figure 5:
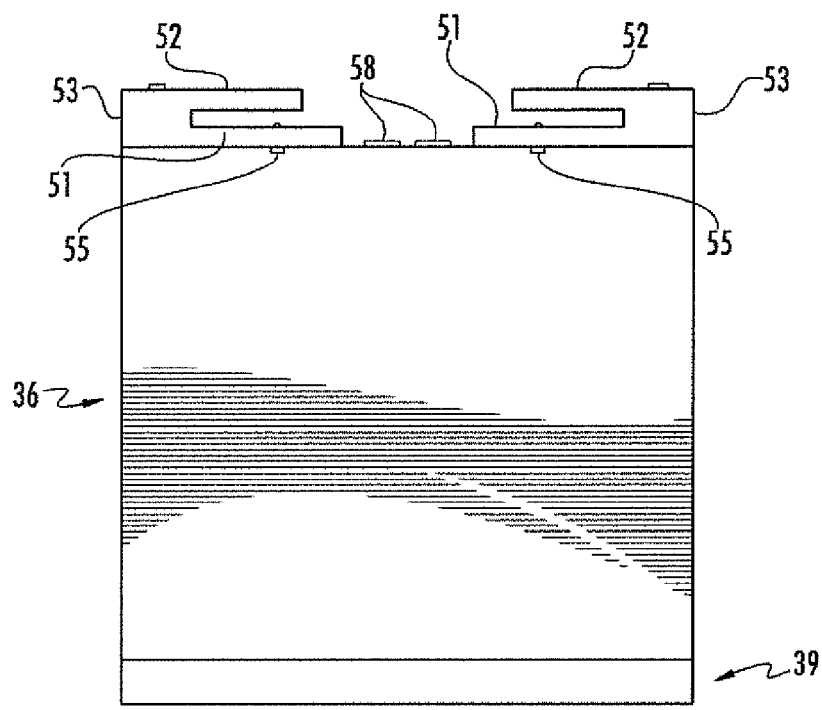
FIG. 5 is a side view of a mounting bracket with two mounting clamps for attaching to respective frames of two adjacent modules.
Figure 6:
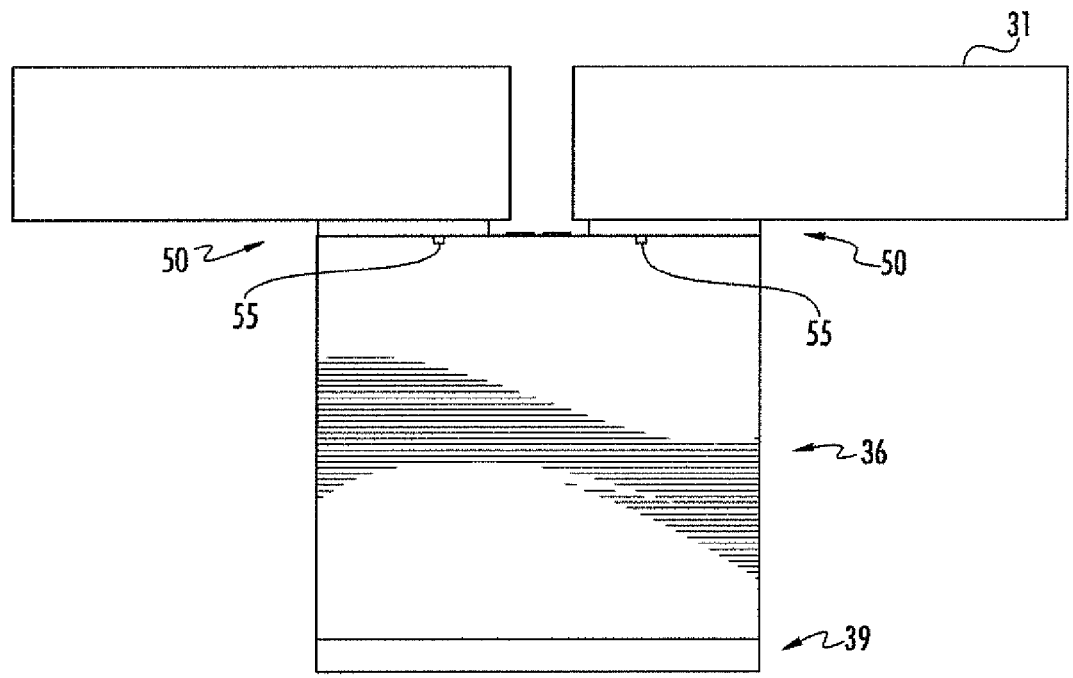
FIG. 6 is an end view of a mounting bracket with two mounting clamps respectively connected to two adjacent modules.
Figure 7:
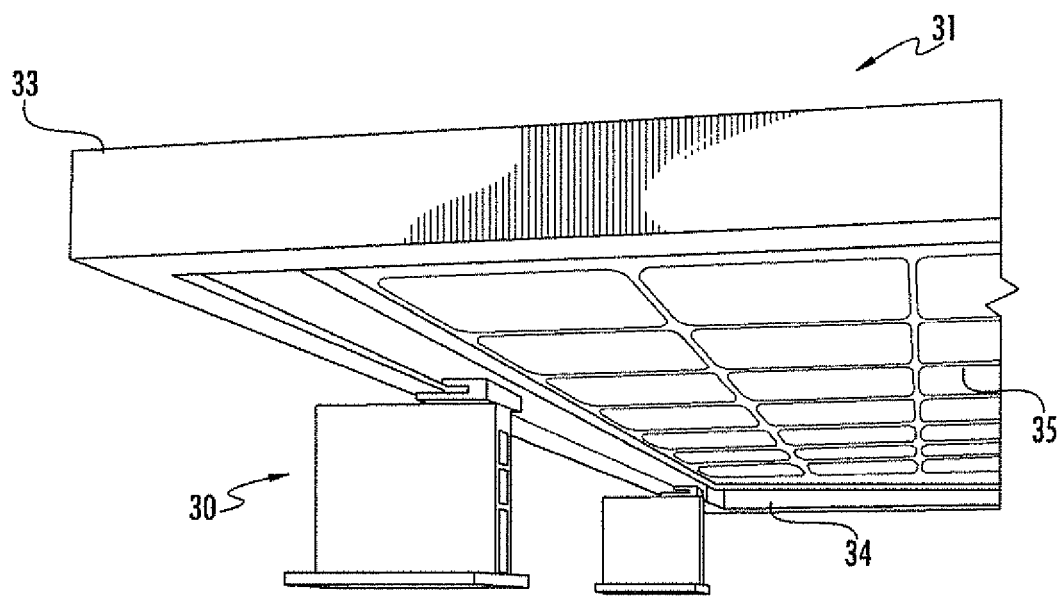
FIG. 7 is a three-dimensional perspective view of a pair of mounting brackets as shown in FIG. 4 each having a respective mounting clamp coupled to a same panel.
Figure 8:
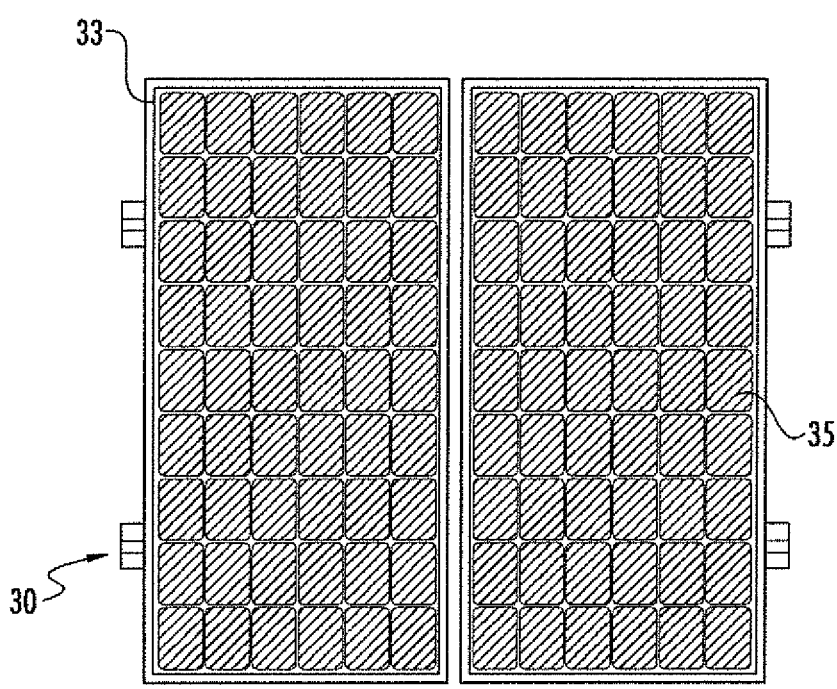
FIG. 8 is a top view of two panels as they would appear installed on a rooftop using a plurality of the bracket assemblies illustrated in FIGS. 4 and 6.

In the illustrated example, the feet 32 are attached to the underside lip 34 of each panel frame 33, as shown in FIGS. 4 and 7. While still on the ground, the installation technician may advantageously attach the feet 32 to the bottom of each panel on their longer sides (e.g., top and bottom sides) with the front edge of the foot facing out from the panel using an under-mounting clamp 50. However, the feet 32 may be attached to the other sides of the panels 31 as well in some embodiments, and the panels may also be attached to the feet after the feet have been installed on the rooftop 44, if desired.

The mounting clamp 50 illustratively includes a bottom flange 51, a top flange 52 spaced apart from the bottom flange and partially overhanging the bottom flange (see FIG. 3) to define a slot therebetween, and an end extension 53 coupling respective ends of the bottom flange and top flange together. The slot is configured to engage or receive the lip 34 of the solar panel 31, as seen in FIG. 7. The mounting clamp 50 further illustratively includes a fastener channel connector 54 coupled to the bottom flange 51 and configured to be slidably received within the fastener channel 41.

Figure 2:
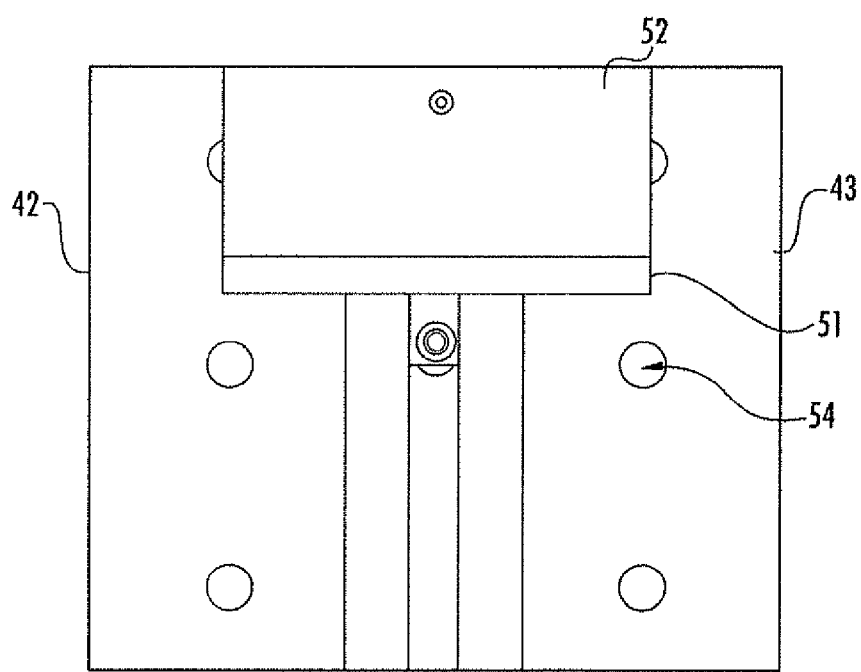
FIG. 2 is a top view of the mounting bracket of FIG. 1 with mounting holes for securing the bracket to a structure.
Figure 3:
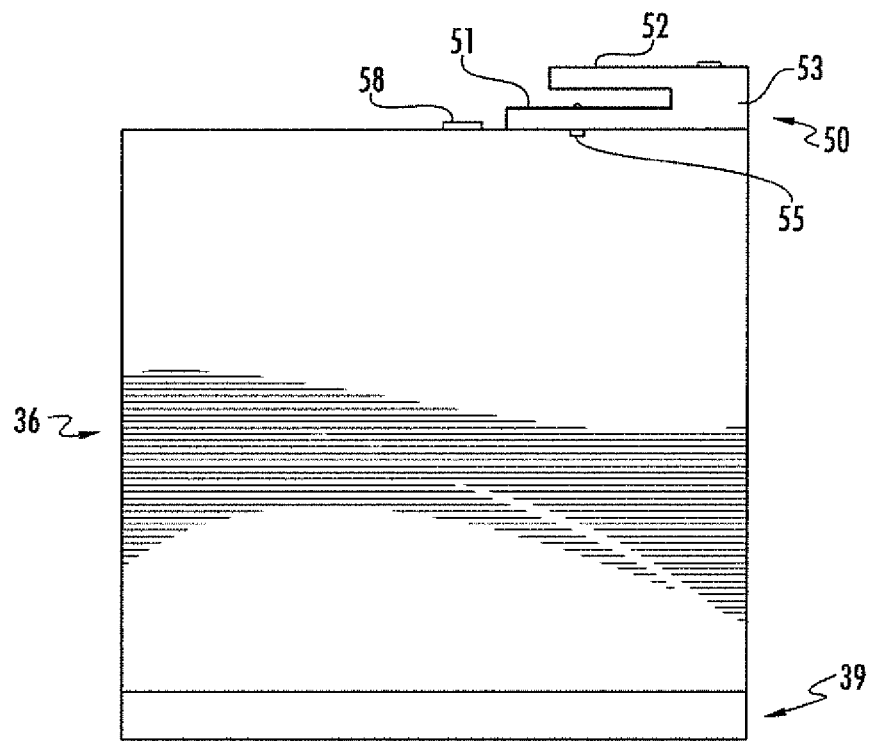
FIG. 3 is a side view of the mounting bracket with a single mounting clamp for attaching to the exterior sides of panels located at the perimeter of a panel array.

In the present example, the fastener channel connector 54 illustratively includes a T-shaped connector or slide bar coupled to the bottom flange 51 on a side thereof opposite the top flange 52 (i.e., on its bottom side). The T-shaped connector 57 is configured to be slidably received within the fastener channel 41, as seen in FIGS. 1 and 2. The fastener channel connector 54 may first be attached to the solar panel 31, and then the feet 32 connected to respective mounting clamps 50. Another approach is that the mounting clamps 50 may be coupled to respective feet 32, and the entire assembly 30 (i.e., mounting clamp plus foot) may then be connected to the solar panel 31. The mounting clamp 50 further illustratively includes a retaining set screw(s) 55 which may be tightened to secure the lip 34 within the slot between the bottom and top flanges 51, 52, and a slide bar retaining bolt 58 and a corresponding nut 59.

A first row of panels 31 may then be attached on the roof 44 with deck screws 60 through mounting holes 61 in the side extensions 42, 43 on the outward or perimeter side of the array, typically in a straight line. In some instances, a sealant may be used under each foot 32, if desired. Various types of sealant may be used, such as caulking, tar, Butyl tape, etc. An adjacent row of solar panels 31 may then be attached with additional feet 32 adjacent to the first row of solar panels so as to share the second set of feet (see FIGS. 5 and 6) between them. That is, the fastener channel 41 of each vertical extension portion may be of sufficient dimensions or length to slidably receive two (or more) fastener channel connectors 54 therein. While the feet 32 are shared between adjacent panels, the mounting clamps 50 retain each solar panel 31 independently. This allows each solar panel 31 to be installed and secured individually, and in the event that a solar panel is to be removed from an array, this can be done independently without loosening the adjacent solar panel, which is generally not possible with typical panel or panel mounting arrangements.

The installation process may be repeated for each row of solar panels 31 to be installed, until the last row of solar panels is reached. On the outer perimeter of the last solar panel 31, one mounting clamp 50 may be used per foot 32 to attach to the outer edge of each of the perimeter solar panels (see, e.g., FIGS. 4 and 7).

A significant advantage of the assembly 30 is that it may advantageously be connected or coupled to a respective solar panel 31 on the ground, rather than having to be coupled to the solar panel on the roof 44 where this is more difficult (and potentially more dangerous), and where it is much harder to recover dropped tools, screws, nuts, washers, or other parts. Moreover, this may also help expedite the installation process.

The hollow channels or passageways 37 in the vertical extension 36 may serve as wire management channels, which may be used for keeping electrical transmission wires (e.g., for PV panels) or temperature sensor wires (e.g., for a water heater panels) secured in place. However, the cross-support members 56 which define the channels 37 need not be included in all embodiments, although even when the channels are not used for routing wires the cross-support members may provide added rigidity and/or stability to the feet 32. It should also be noted that the vertical extension 36 of the foot 32 need not be hollow in all embodiments, and that different shapes beside a rectangular shape may also be used for the base 39 and/or the vertical extension in some embodiments. Example materials for the foot 32 and the mounting clamp 50 may include aluminum, which may be extruded into the desired shape, although other suitable materials may also be used in different embodiments. The various screws and fasteners described herein may be stainless steel, brass, galvanized steel, etc.

Here again, a sealant may optionally be used under each foot 32 so that the screws 60 are screwed through the foot 32 and sealant into the roof or decking 44 at desired locations. By way of example, two or more feet 32 may be secured to the roof 44 to receive one side of the panel, i.e., two (or more) feet are used on each of the top and bottom sides or edges of the solar panel 31, as shown in FIG. 7, although in some embodiments a single foot may be used.

It should be noted that the above-described mounting assembly 30 may be used with a variety of roof types, including flat and sloped roofs, and over different types of roof coverings (e.g., shingles, tiles, panels, etc.). Moreover, the mounting feet may be used for installations other than on rooftops, such as where mounting to the side of a building or other structure is required.

Figure 9:
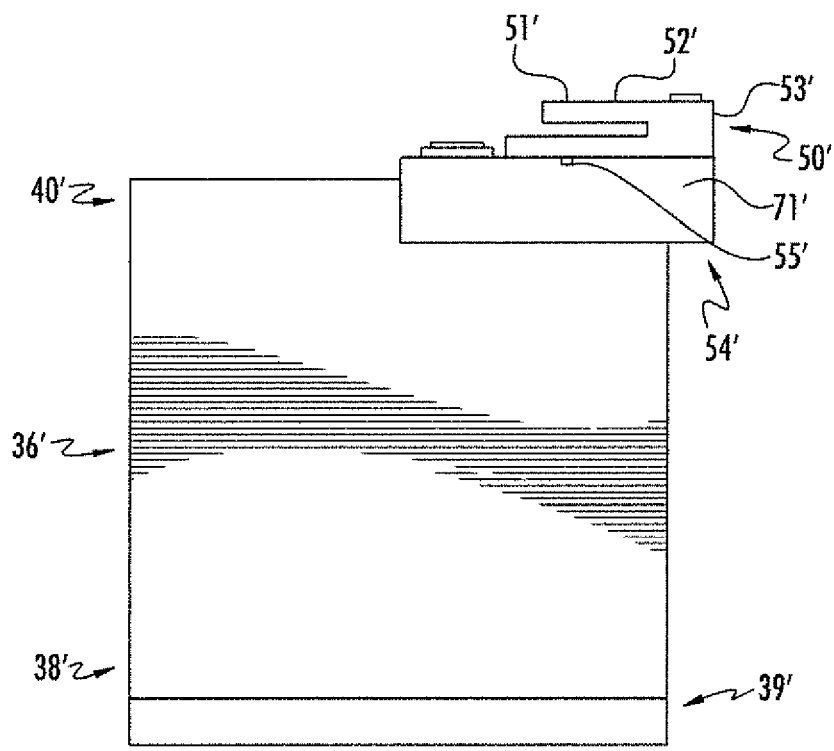
FIGS. 9-11 are respective side, end, and perspective illustrations of another example mounting bracket assembly which includes another example fastener channel connector configuration.
Figure 10:
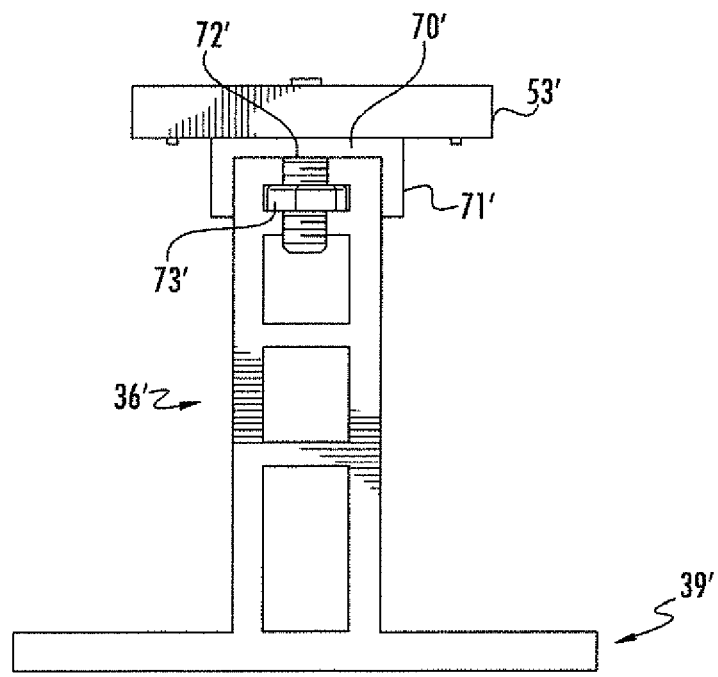
Figure 11:
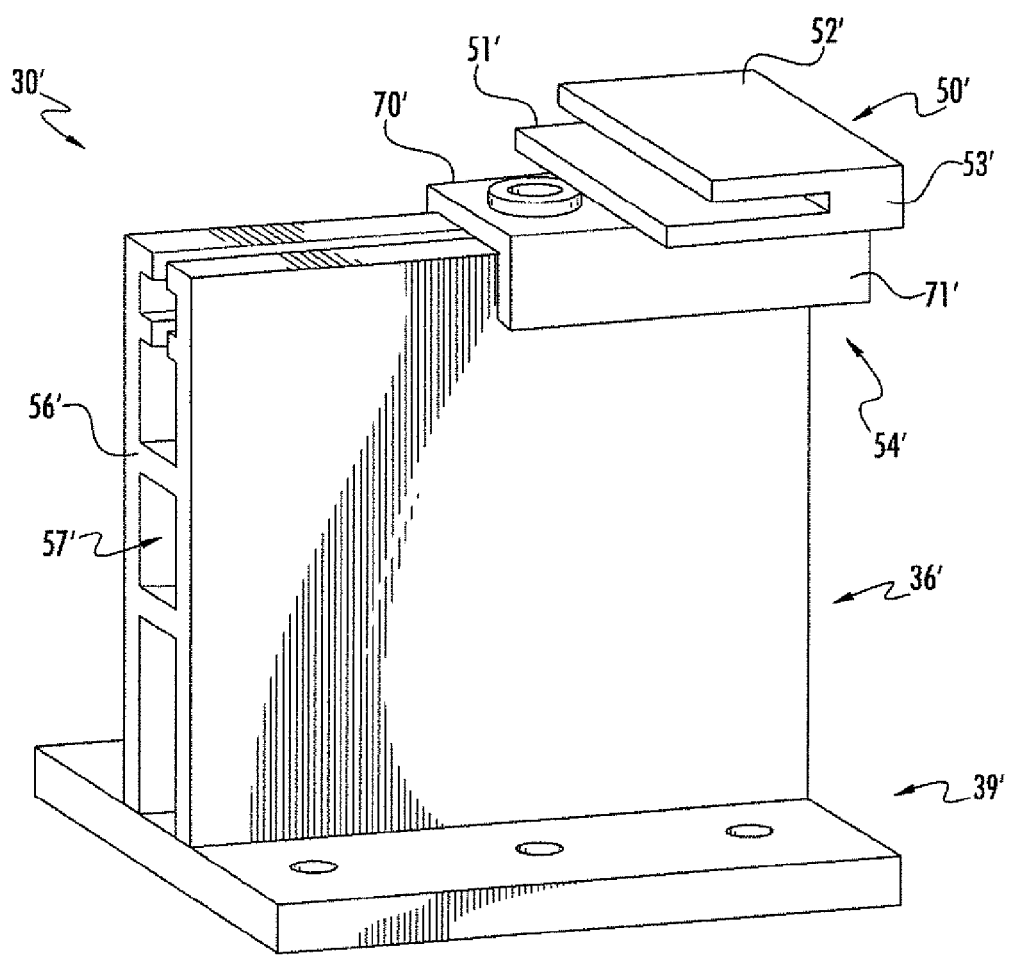

In accordance with another example embodiment now described with reference to FIGS. 9-11, the fastener channel connector 54' may in this configuration include a horizontal base or platform member 70' having an upper surface coupled to the mounting clamp 50' and a lower surface positioned on the distal end 40' of the vertical extension 35', instead of the slide bar configuration shown in FIG. 1. A pair of spaced apart vertical side members 71' are coupled to opposite sides of the horizontal member 70' and extend along the distal end 40' of the vertical extension 36' when the lower surface of the horizontal member is positioned on the distal end of the vertical extension 36'. Stated alternatively, this configuration generally has an inverted "U" shape (as seen from the end view of FIG. 10) defining a channel that fits on the distal end 40' of the vertical extension 36'. A bolt 72' is coupled to the horizontal member 70' and configured to extend downward into the fastener channel 41' when the lower surface of the horizontal member is positioned on the distal end 40' of the vertical extension 36', and a nut 73' may be screwed onto the bolt and configured to be slidably received within the fastener channel.

In the present example, the fastener channel connector 54' allows for the mounting clamp 50' of each independent solar panel to remain attached to that solar panel, but yet be removed from the corresponding mounting bracket 32', allowing each solar panel to be detached from its mounts by removing each retaining bolt 72' and nut 73'. This facilitates the removal of solar panels independent from other panels within the array without the disruption of adjacent panels, which again may not be possible with typical mounting systems.

In another example embodiment, the above-described assembly 30 may be used for mounting solar panels without an outer frame (i.e., a frameless panel or module). That is, the mounting clamps 50 could be coupled directly to the photovoltaic cell array 35, by directing the slot between the bottom and top flanges 51, 52 inward to receive the cell array panel therein (as opposed to the slots facing outward to receive the outer frame lip 34 as described above). To this end, a material such as rubber, etc., may be positioned or adhered within the slot to help protect and/or securely hold the cell array 35. Moreover, the set screw 55 may still be used to secure the cell array 35 within the slot, and in some configurations a small plate (e.g., stainless steel plate, etc.) may be coupled to or actuated by the set screw to be pressed into contact to secure the cell array within the slot, as will be appreciated by those skilled in the art. This may be beneficial to help keep the glass substrate upon which the cell array 35 is formed from cracking, for example.

Many modifications and other embodiments of the invention will come to the mind of one skilled in the art having the benefit of the teachings presented herein. For example, in addition to eyeglasses, the above-described approach may be used with other wearable accessories, such as watches, bracelets, etc. Therefore, it is understood that the invention is not to be limited to the specific exemplary embodiments disclosed herein.

That which is claimed is:
1. A method for mounting a plurality of solar panels on a building, each one of the plurality of solar panels comprising an outer frame defining a lip, the method comprising:
 coupling a plurality of panel mounting bracket assemblies to the plurality of solar panels, each of the panel mounting bracket assemblies comprising
  a base to be positioned on the building,
  a vertical extension having a proximal end coupled to the base and a distal end vertically spaced apart from the base, the distal end defining a fastener channel therein, and
  a plurality of mounting clamps each comprising
   a bottom flange having first and second ends,
   a top flange having first and second ends, the top flange spaced apart from the bottom flange and defining a slot therebetween to receive the lip of a respective one of the plurality of solar panels,
   an end extension coupling the first ends of the bottom flange and the top flange together,
   at least one set screw extendable into the slot between the top and bottom flanges to contact the lip of the respective solar panel and secure the lip within the slot, and
   a fastener channel connector coupled to the bottom flange and configured to be slidably received within the fastener channel of a respective vertical extension; and
 coupling the bases of the mounting brackets to the building with the solar panels attached thereto, wherein at least two fastener channel connectors are connected to a fastener channel of a same vertical extension.
2. The method of claim 1 wherein the fastener channel connector comprises a T-shaped connector coupled to the bottom flange on a side thereof opposite the top flange; and wherein the coupling of the plurality of panel mounting bracket assemblies to the plurality of solar panels further comprises sliding the T-shaped connector of each mounting clamp into a fastener channel of a respective panel mounting bracket.

3. The method of claim 2 wherein each one of the plurality of mounting clamps further comprises a retaining bolt and a corresponding nut coupling the T-shaped connector to the bottom flange.

4. The method of claim 1 wherein the at least one set screw is carried by the bottom flange; and wherein the coupling of the panel mounting bracket assemblies to the plurality of solar panels further comprises tightening the at least one set screw to secure the lip within the slot.

5. The method of claim 1 wherein at least one set screw is carried by the top flange; and wherein the coupling of the panel mounting bracket assemblies to the plurality of solar panels further comprises tightening the at least one set screw to secure the lip within the slot.

6. The method of claim 1 wherein the vertical extension is laterally centered on the base.

7. The method of claim 1 wherein each one of the plurality of panel mounting brackets comprises aluminum.

8. The method of claim 1 wherein the base defines a plurality of mounting holes on opposing sides of the vertical extension.

9. The method of claim 1 wherein the vertical extension is hollow and comprises at least one cross-support member therein.

10. The method of claim 1 wherein the fastener channel connector comprises a horizontal member having an upper surface coupled to the bottom flange and a lower surface to be positioned on the distal end of the vertical extension, a pair of spaced apart vertical side members on opposite sides of the horizontal member and configured to extend along the distal end of the vertical extension when the lower surface of the horizontal member is positioned on the distal end of the vertical extension, a bolt coupled to the lower surface of the horizontal member and configured to extend downward into the fastener channel when the lower surface of the horizontal member is positioned on the distal end of the vertical extension, and a nut to be screwed onto the bolt; and wherein the coupling of the plurality of panel mounting bracket assemblies to the plurality of solar panels further comprises sliding the nut of each mounting clamp into the fastener channel of a respective panel mounting bracket.

11. A method for mounting at least one solar panel on a building, the at least one solar panel comprising an outer frame defining a lip, the method comprising:
coupling a plurality of panel mounting bracket assemblies to the at least one solar panel, each of the panel mounting bracket assemblies comprising
a base to be positioned on the building,
a vertical extension having a proximal end coupled to the base and a distal end vertically spaced apart from the base, the distal end defining a fastener channel therein, and
a mounting clamp comprising
a bottom flange having first and second ends,
a top flange having first and second ends, the top flange spaced apart from the bottom flange and defining a slot therebetween to receive the lip of the at least one solar panel,
an end extension coupling the first ends of the bottom flange and the top flange together, and
a fastener channel connector coupled to the bottom flange and configured to be slidably received within the fastener channel of a respective vertical extension, the fastener channel connector comprising
a horizontal member having an upper surface coupled to the bottom flange and a lower surface to be positioned on the distal end of the vertical extension,
a pair of spaced apart vertical side members on opposite sides of the horizontal member and configured to extend along the distal end of the vertical extension when the lower surface of the horizontal member is positioned on the distal end of the vertical extension,
a bolt coupled to the lower surface of the horizontal member and configured to extend downward into the fastener channel when the lower surface of the horizontal member is positioned on the distal end of the vertical extension, and
a nut to be screwed onto the bolt and configured to be slidably received within the fastener channel; and
coupling the bases of the mounting bracket assemblies to the building with the at least one solar panel attached thereto.

12. The method of claim 11 wherein each of the plurality of mounting clamps further comprises at least one set screw carried by the bottom flange; and wherein the coupling of the panel mounting bracket assemblies to the at least one solar panel further comprises tightening the at least one set screw to secure the lip within the slot.

13. The method of claim 11 wherein each of the plurality of mounting clamps further comprises at least one set screw carried by the top flange; and wherein the coupling of the panel mounting bracket assemblies to the at least one solar panel further comprises tightening the at least one set screw to secure the lip within the slot.

14. The method of claim 11 wherein the vertical extension is laterally centered on the base.

15. The method of claim 11 wherein the vertical extension is hollow and comprises at least one cross-support member therein.

16. A method for mounting at least one solar panel on a building, the at least one solar panel comprising an outer frame defining a lip, the method comprising:
coupling a plurality of solar panel mounting assemblies to the at least one solar panel, each solar panel mounting assembly comprising
a panel mounting bracket comprising
a base to be positioned on a building,
a vertical extension having a proximal end coupled to the base and a distal end vertically spaced apart from the base, the distal end defining a fastener channel therein, and
a mounting clamp comprising
a bottom flange having and end,
a top flange having an end and being spaced apart from the bottom flange and partially overhanging the bottom flange and defining a slot therebetween and receiving the lip of the at least one solar panel therein,
an end extension coupling the ends of the bottom flange and top flange together,
at least one set screw extendable into the slot between the upper and lower flanges to contact the lip of the respective solar panel and secure the lip within the slot, and a fastener channel connector coupled to the bottom flange and configured to be slidably received within the fastener channel; and coupling the bases of the mounting brackets to the building with the at least one solar panel attached thereto.

17. The method of claim 16 wherein the fastener channel connector comprises a T-shaped connector coupled to the bottom flange on a side thereof opposite the top flange; and further comprising sliding the T-shaped connector of each mounting clamp into a fastener channel of a respective panel mounting bracket.

18. The method of claim 16 wherein the fastener channel connector comprises a horizontal member having an upper surface coupled to the bottom flange and a lower surface to be positioned on the distal end of the vertical extension, a pair of spaced apart vertical side members on opposite sides of the horizontal member and configured to extend along the distal end of the vertical extension when the lower surface of the horizontal member is positioned on the distal end of the vertical extension, a bolt coupled to the lower surface of the horizontal member and configured to extend downward into the fastener channel when the lower surface of the horizontal member is positioned on the distal end of the vertical extension, and a nut to be screwed onto the bolt; and further comprising sliding the nut of each mounting clamp into the fastener channel of a respective panel mounting bracket.

19. The method of claim 16 wherein the at least one solar panel comprises a plurality of solar panels; and wherein the coupling of the plurality of solar panel mounting assemblies to the at least one solar panel further comprises sliding the fastener channel connector of at least two mounting clamps each coupled to the outer frame of different respective solar panels into the fastener channel of a same vertical extension.

20. The method of claim 16 wherein the coupling of the panel mounting bracket assemblies to the at least one solar panel further comprises tightening the at least one set screw to secure the lip within the slot.

\* \* \* \* \*